United States Patent Office 3,549,523
Patented Dec. 22, 1970

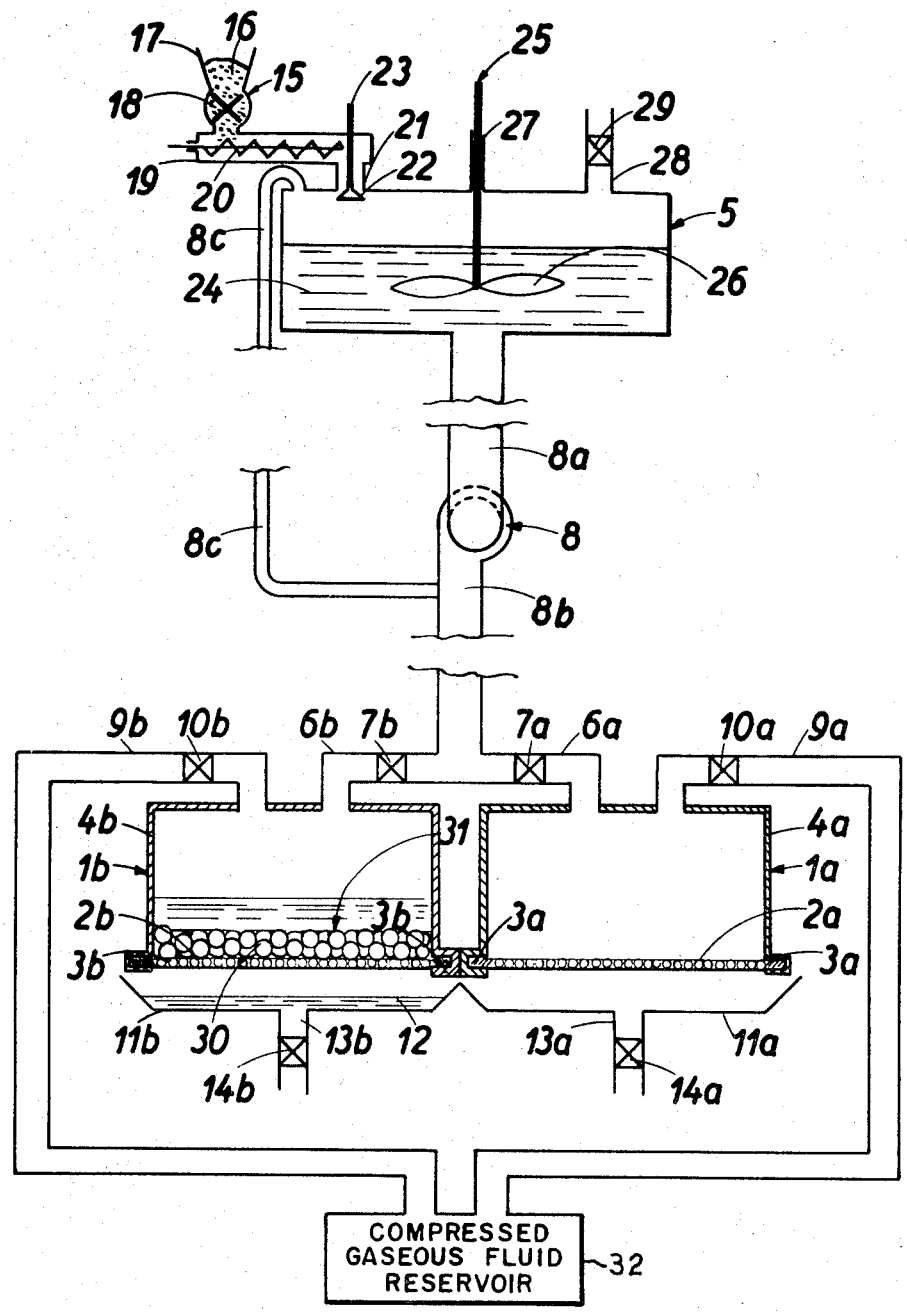

3,549,523
METHOD FOR EXTRACTING SOLID PARTICLES FROM A LIQUID
Pierre Gilard, Mont sur Marchienne, and Maurice Galanti, Ransart, Belgium, assignors to Institut National du Verre A.S.B.L., Charleroi, Belgium
Filed Dec. 7, 1967, Ser. No. 688,813
Claims priority, application Luxembourg, Dec. 13, 1966, 52,592
Int. Cl. B01d 15/00
U.S. Cl. 210—24                    11 Claims

ABSTRACT OF THE DISCLOSURE

A device and method for extracting solid particles from a liquid in which they are suspended. At least one powdered agent is added to and mixed with the liquid which powdered agent associates with the solid particles. The mixed liquid is then passed through a liquid-permeable filter support on which a cake is formed of the powdered agent and the solid particles.

BACKGROUND OF THE INVENTION

The present invention relates generally to the extraction field, and, more particularly, to a method and apparatus for extracting solid particles from a liquid by physical means and which particles are suspended in the liquid.

It is known that the extraction of solid particles which are suspended in a liquid in many industries constitutes a technological problem whose importance is constantly and rapidly increasing as the volume of liquid to be treated during a given period becomes considerable and the solid particles to be extracted from the liquid have a high economic value. For example, in the mirror industry efforts are made to recover the silver from the silver-bearing residual solutions. In fact, it is known that in the silvering techniques which are used to manufacture mirrors, for example from sheets of glass, large quantities of silver-bearing solutions are used, only a small proportion of which is actually used to form a silver deposit, for example, between 10 and 20 percent. The portion of the solution which has not been directly used is then collected together with rinsing liquids in storage facilities. These silver-bearing residual solutions are then subjected to known recovery methods such as decanting and centrifuging in order to collect silver-bearing sediments. These sediments are then treated in appropriate thermochemical operations, such as carbonate fusion, to obtain the silver metal.

Unfortunately, the known methods for recovering silver from silver-bearing residual solutions have serious technological disadvantages which substantially increase the costs of operation in mirror factories. In methods which use decanting with or without a reagent there is required the construction of expensive decanting tanks, and the costs of these rise rapidly with their overall sizes and dimensions become considerable. On the other hand, centrifuging methods require relatively complex equipment which becomes more expensive as the volume of liquid to be treated increases.

SUMMARY OF THE INVENTION

With this in mind, it is a main object of the present invention to obviate or substantially reduce the above-mentioned disadvantages of the prior art.

Another object is to provide a method and apparatus for the recovery of solid particles which can be carried out successively without stopping the flow of liquid and without the need to convey the liquid to an intermediate reservoir.

These objects and others are accomplished in accordance with preferred embodiments of the present invention wherein at least one powdered agent which associates with the solid particles is added to and mixed with the liquid. The exact nature of the association hereabove referred to is not always known, however it can be a chemical, or electrical, or physical (for instance absorption, adsorption) association. This mixed liquid is then conveyed under pressure onto a liquid-permeable filtering support, and a solid, porous material in the form of a cake is retained on the filtering support, this cake containing the solid particles and the powdered agents together.

BRIEF DESCRIPTION OF THE DRAWING

The sole figure of drawing is a schematic vertical sectional view through the apparatus of the present invention.

DESCRIPTION OF THE PREFERRED EMBODIMENTS

A tank 5 is provided into which the liquid containing solid particles is introduced and where it is mixed with the powdered agent. The mixed liquid then passes downwardly and by means of valves can be selectively placed into the two chambers 1a and 1b which are provided to permit continuous operation for the extraction of solid particles from the continuously flowing liquid. The bottoms of these chambers are provided with filtering supports 2a and 2b formed, for example, by screens made of vegetable fibers and which are liquid-permeable. These screens are slidably mounted in slideways 3a and 3b. Except for the bottoms of the chambers 1a and 1b, they are closed by walls 4a and 4b which are sufficiently strong as to be capable of sustaining a pressure of several kilograms per square centimeter.

The tops of chambers 1a and 1b are connected to a tank 5 by means of a liquid-distributing system including two ducts 6a and 6b provided with valves 7a and 7b, respectively, and by a pump 8 which can raise the pressure of a liquid to several kilograms per square centimeter and which has a suction pipe 8a and a delivery 8b. Auxiliary pipe 8c is provided and connected to the delivery pipe 8b to enable a portion of the delivered liquid to be bypassed so as to maintain a sensibly constant level in the tank, so as to make sure that the same operative conditions are prevailing, and so as to assure that there can be continuous operation. A compressed gaseous fluid reservoir 32 is provided and is connected with the chambers 1a and 1b by means of ducts 9a and 9b which are provided with valves 10a and 10b, respectively. Two containers 11a and 11b are provided below the chambers 1a and 1b and collect the filtered liquid 12 and convey it through to discharge pipes 13a and 13b provided with valves 14a and 14b.

The tank 5 provided above the chambers 1a and 1b has a feed device 15 for introducing metered quantities of a powdered agent 16 which associates with the solid particles. Device 15 is formed by a funnel 17 provided with a rotating distributor 18 which causes metered quantities of the powdered agent 16 to fall into one end of a horizontal cylinder 19 provided with an Archimedes' Screw 20. The powdered agent is driven by the Archimedes' Screw 20 to the other end of the horizontal cylinder where it enters a vertical duct 21 connected to tank 5. As the powdered agent falls, it encounters a bell-shaped member 22 rigidly secured to a movable vertical rod 23. In the lower position of the vertical rod 23, as shown in the drawings, the bell-shaped member 22 distributes the powdered agent 16 which is added to liquid 24 which contains the solid particles and which itself is disposed in tank 5.

A mixer 25 is connected with the tank 5 and includes a propeller or impeller 26 connected to the bottom end of a rotatable shaft 27 which is vertically disposed and movable vertically. Tank 5 also is provided with a feed pipe 28 having a valve 29 and through which the liquid 24 is fed into tank 5.

In operation, the valve 29 is opened to admit liquid 24 into tank 5 until the liquid attains desired level. Once this level has been attained, and thus there is a given volume of liquid 24 in the tank 5, valve 29 is closed. The rotary distributor 18 and Archimedes' Screw are then rotated at speeds which depend upon the quantity of powdered agent 16 which it is desired to add to the volume of liquid 24 in the tank 5. The bell-shaped member 22 has been in its raised position in which it closes the bottom end of pipe 21 and at the time that the rotary distributor 18 and Archimedes' Screw are rotated, the bell-shaped member 22 is lowered so that the passage is opened and the powdered agent is added into the tank 5. Finally, the mixer 25 is started and it is rotated at a selected speed and distributes the powdered agent sufficiently homogeneously in the liquid 24.

After these preliminary operations, valve 7b is opened so that the liquid 24 which is mixed with the powdered agent 16 is conveyed onto the filtering support 2b of the chamber 1b at a delivery rate and pressure determined by the capacity and delivery pressure of pump 8. As the liquid 24 passes through the filtering support 2b, the filtering support filters out and retains a solid porous substance 30 which contains the solid particles to be extracted and the powdered agent 16 and forms the base of a cake 31. The filtrate 12 is collected in the container 11b and is discharged through the pipe 13b from which it may be fed into a sewerage system. As a matter of example, it has been found that with two chambers 1a and 1b, alternately operated, each having a filtering support of ¼ square meter, this support being made of cotton fibers, with holes of about 0.05 x 0.05 mm., the rate of filtration reaches 200 liters per hour, if the pressure is maintained between 2 and 3 kg./cm.². The size of the particles to be recovered, for instance cerium oxide, was between 20 and 100 microns, but it has been found that by virtue of the association of these particles with the powdered agent, in the present case a diatomite, even the particles as small as 20 microns were prevented from passing through the holes of the filtering support.

When it is desired to continue to form a cake 31 until it is of a predetermined thickness, valve 29 is again opened while the valve 7b is opened and there is further delivery of solid particle containing liquid 24. This delivery ensures the maintenance of the desired liquid level in tank 5, for the same reason explained hereabove and the addition of powdered agent is stopped. The liquid 24, which contains less and less powdered agent and then after a given time none at all, is caused to flow onto the filtering support 2b. It has been found experimentally that the duration of this flow of liquid to which nothing has been added varies greatly according to certain limiting conditions, for example, a maximum pressure in the chamber 1b and/or a minimum desired delivery. When such a limiting condition occurs, it has, surprisingly, been found that if a fresh quantity of powdered agent is added to the liquid, such as a quantity equal to that which was introduced previously, this fresh addition has the effect of, for example, rapidly reducing to a substantially lower value the pressure that had risen gradually in the chamber 1b up to the maximum pressure which had been selected as a limiting condition. When the cake 31 has reached a sufficient thickness, i.e. when chamber 1b is substantially filled, one skilled in the art will easily realize how he can remove cake 31, after having removed the slideway 3b, and operate the valves and other items of chamber 1a, so as to perform processing in chamber 1a, similarly as it was precedently preformed in chamber 1b, and while the latter is being discharged, in such a way that the process can be pursued without interruption alternately in chambers 1b and 1a.

It has also been discovered that after the fresh addition as mentioned above, the addition of powdered agent can be stopped momentarily while flowing of the liquid onto and through the filtering support continues until one of the above-mentioned limiting conditions again occurs. It has been found that these operational cycles can be repeated several times until the formation of the cake is complete.

As an example of the present invention, in the extraction of the metal silver from silver-bearing residual solutions as obtained in mirror factories, the grain size of the powdered agent is generally less than 20 microns and the quantity of powdered agent added per liter of liquid would be 0.1 to 40 grams. The pressure at which the liquid, whether mixed or otherwise, is conveyed onto and through the filtering support on which a cake may be in the process of formation, would be from 1 to 6 kilograms per square centimeter.

Thus, with the present invention cakes of a solid porous substance can be obtained rapidly and directly. The subsequent treatment of these cakes in a thermochemical operation is easy and rapid and there is no need for bulky facilities as most decanting tanks are of complex equipment as with centrifuging. The method of the present invention permits the formation of cakes of a solid porous substance to be obtained successively without stopping the flow of liquid containing the solid particles to be extracted and without the need to convey such liquid to an intermediate reservoir. Furthermore, the method substantially improves the profit margin of a plant in which solid particles are recovered from a liquid. For example, in the mirror industry this improvement is particularly important because of the economic value of the products recovered and the very large volume of silver-bearing residual solution which can be collected in a working day.

The permeability of the cake is controlled as it becomes thicker by controlling the added quantity of at least one of the powdered agents which associate with the solid particles. These powdered agents are preferably one or more siliceous rocks of biological origin, for example diatomites, which are commonly commercially available, and used in view of the recovery of the noble metals such as silver, gold, palladium, osmium, as well as of precious oxides such as cerium or thallium oxides. However, good results and efficiency are obtained for the recovery of these oxides when using powdered agents chosen in the groups of siliceous ballotini and insoluble phosphates and/or oxides of elements in columns II and III of the Periodic Table according to Mendeleev, provided these powdered agents have sizes between 0.010 mm. and 1 mm. The holes within the screen of the supporting filter should not exceed twice the size of the smallest particles of the powdered agent. This regulation enables cakes of variable thicknesses to be formed while satisfactory permeability of the cakes is maintained during their formation until the desired thickness is reached. The permeability of the cake is maintained above a predetermined value as it becomes thicker by continuously adding at least one of the powdered agents which associates with the solid particles. Thus, a given flow of liquid can be conveyed onto the filtering support during the entire duration of formation of the cake and there is assurance that a flow of liquid at least equal to this given flow will be able to pass through the cake for the entire time of operation. The continuous addition of at least one of the powdered agents which associate with the solid particles can be carried out either by adding a constant quantity for the entire period of formation of the cake or by adding a quantity which varies during the period of formation of the cake, for example, a quantity that increases slightly towards the end of the formation of the cake. Any time that a new addition of some powdered agent takes place, it is found that the permeability of the cake increases. However, if it is intended to intermittently increase the permeability of the cake, for instance at regular intervals, in such a way that this permeability increases up to the initial value which existed when the pre-cake was formed, it will as a rule be necessary to make successive additions of powdered agent, each time adding a somewhat greater amount than the preceding time.

The permeability of the cake can be maintained above a predetermined value as it becomes thicker by intermittently adding at least one of the powdered agents that associates with the solid particles. By way of example, it has been found that in a case when the flow of filtered liquid is maintained at a value of 2 liters/min./dm.$^2$, the pressure must be increased during a period of half an hour, from 2 kg./cm.$^2$ to 3.7 kg./cm.$^2$. At this time, a quantity of 3 gr./dm.$^2$ of the surface of the filter, of the powdered agent (diatomite) is sufficient to bring down the pressure to 2 kg./cm.$^2$ for the same flow of liquid.

Thus, as mentioned above, it has been found that the addition to and mixing of a powdered agent with the liquid during the time that varies according to the above-mentioned limiting conditions can be interrupted. The limiting conditions as mentioned above are a maximum pressure within the chamber containing the filtering support and/or a desired minimum flow rate. Also, the liquid containing no additive can continue to be fed onto the filtering support during the same time until a limiting condition is reached. If after the limiting condition has been reached a fresh quantity of powdered agent is added to and mixed with the liquid, the surprising effect is provided that the fresh addition increases the permeability of the cake which has already formed on the filtering support. After this fresh addition, the addition and mixing of the powdered agent can be interrupted again and, if the cycle of operations described above is continued, a large amount of liquid can still be passed through the cake until one of the above-mentioned limiting conditions occurs. These operational cycles can be repeated several times until a cake has been completely formed.

According to the present invention, at least one of the powdered agents that associate with the solid particles is a silicieous rock of biological origin, for example, diatomite.

After the cake has been increased to a desired thickness, the cohesion of the cake is increased by passing the gaseous fluid through it. This is accomplished by closing valve 7b and opening valve 10b so that the compressed gaseous fluid from reservoir 32 can flow through duct 9b and force out the remainder of liquid from the chamber 1b and then compress the cake to increase its cohesion. This produces cakes of a solid porous substance which are relatively dry and sufficiently coherent to be handled. In the subsequent treatment in an appropriate thermochemical operation, such as carbonate fusion, this form of the solid porous substance containing the solid particles an the powdered agent is much preferred to the treatment of such particles in the form of sediments.

It can thus be seen that the present invention provides an apapratus for extracting solid particles from a liquid by physical means and has means for adding to and mixing with the liquid at least one powdered agent which associates with the solid particles as well as means for subjecting the mixed liquid to pressure and a filtering support which retains a solid porous substance in the form of a cake and which contains the solid particles and powdered agent together.

The apparatus produces a cake of solid porous substance whose subsequent treatment in a thermochemical operation is easy and rapid and does not require considerable investment nor does it require much maintenance. The apparatus can be used continuously since it operates sufficiently efficiently and reliably. The apparatus is provided with means for controlling the added quantity of at least one of the powdered agents. These means enable the apparatus to be controlled in a flexible manner so that it can easily be adapted to a wide range of installations for the treatment of liquids containing solid particles in suspension, such as in relatively small mirror factories in which a large volume of silver-bearing residual solutions are to be treated.

The apparatus also provides a means for passing a gaseous fluid through the cake after its formation to the desired thickness so as to produce a cake of a solid porous substance which is relatively dry and sufficiently coherent to be handled. In this form, the solid porous substance is much easier to store than in the form of sludges with a view to subsequent treatment.

It will be understood that the above description of the present invention is susceptible to various modifications, changes, and adaptations, and the same are intended to be comprehended within the meaning and range of equivalents of the appended claims.

What is claimed is:

1. A method for extracting solid particles constituted at least in part by a precious metal by physical means from a liquid which contains them in a state of suspension, comprising the steps of:
   adding to a liquid having solid particles constituted at least in part by silver, or a silver compound, or a compound of another noble metal suspended therein, at least one powdered agent which associates with the solid particles;
   mixing the at least one powdered agent and the liquid; and
   passing the mixed liquid under pressure through a liquid-permeable filtering support to form a cake on said support and which cake contains the solid particles and powdered agents.

2. A method as defined in claim 1 comprising controlling the permeability of the cake as it becomes thicker by controlling the quantity added of at least one of the powdered agents.

3. A method as defined in claim 2 wherein the permeability of the cake is controlled to be maintained above a predetermined value as it becomes thicker by continuously adding at least one of the powdered agents.

4. A method as defined in claim 3 comprising continuously adding a constant quantity of at least one of the powdered agents.

5. A method as defined in claim 3 comprising continuously adding a variable quantity of at least one of the powdered agents.

6. A method as defined in claim 2 wherein the permeability of the cake is controlled to be maintained above a predetermined value as it becomes thicker by intermittently adding at least one of the powdered agents.

7. A method as defined in claim 1 wherein the solid particles contained in the cake have the same chemical composition as the particles initially suspended in the liquid.

8. A method as defined in claim 7 wherein at least one of the powdered agents is chosen from the group consisting of the siliceous rocks of biological design, siliceous ballotini and insoluble phosphates and/or oxides of elements in columns II and III of the Periodic Table according to Mendeleev.

9. A method as defined in claim 8 wherein the siliceous rock is diatomite.

10. A method as defined in claim 1 comprising passing a gaseous fluid through the cake after it has increased to a desired thickness to increase the cohesion of the cake.

11. A method as defined in claim 1 wherein the particles are at least in part constituted by a noble metal oxide.

References Cited

UNITED STATES PATENTS

| | | | |
|---|---|---|---|
| 1,992,101 | 2/1935 | Stuart | 210—193X |
| 2,164,826 | 7/1939 | Langwell et al. | 75—118X |
| 2,210,719 | 8/1940 | Hodges | 210—193X |
| 2,455,130 | 11/1948 | Lomax | 210—75 |
| 2,468,188 | 4/1949 | Frankenhoff | 210—75 |

FOREIGN PATENTS 777,001  6/1957  Great Britain _____ 210—193

MICHAEL E. ROGERS, Primary Examiner

U.S. Cl. X.R.

75—118; 210—68, 75, 193